UNITED STATES PATENT OFFICE.

WILLIAM M. REESE, OF DILLON, KANSAS.

PLASTER.

SPECIFICATION forming part of Letters Patent No. 554,142, dated February 4, 1896.

Application filed March 7, 1893. Serial No. 465,046. (No specimens.)

*To all whom it may concern:*

Be it known that I, WILLIAM M. REESE, of Dillon, in the county of Dickinson, in the State of Kansas, have invented certain new and useful Improvements in Plaster and in the Process of Manufacturing the Same, of which the following is a specification.

My invention relates to certain new and useful improvements in commercial plaster, and in the process of manufacturing the same, and my invention consists in certain features of novelty hereinafter described and pointed out in the claim.

The commercial plaster which I manufacture is prepared from concentrated tankage or stick, a well-known residuum from the rendering of fats, and sulphate of lime, commonly called "gypsum." The concentrated tankage I use in a dry state and the sulphate of lime may be used in the natural form in a pulverized condition. The process by which I manufacture the plaster is as follows:

I heat the sulphate of lime in kettles or retorts in the presence of tankage thoroughly mixed therewith in dry powdered form until all its moisture and water is driven off and it assumes an amorphous condition. I add the concentrated tankage in about the proportion of ten pounds of concentrated tankage to two thousand pounds of sulphate of lime, thoroughly mixing the same, when by the action of the heat at a temperature of from 380° to 420° Fahrenheit the concentrated tankage is decomposed, the organic matter thereof being charred, while the other elements of the concentrated tankage enter into combination with the sulphate of lime, forming an amorphous powder, which may be handled and shipped in this condition and upon arriving at the place where it is to be used may be converted into mortar in the usual manner.

Among the advantages I claim for my invention are, first, economy, in that the operations of the manufacturer can be far more economically performed at the mill than elsewhere, and an article is produced ready for application when received by the consumer, where it would be very inconvenient and expensive to properly heat and mix the ingredients to form the compounds; second, that an article is produced free of oils and other deleterious and extraneous elements, and, third, convenience, the article being ready for use when received by the consumer.

Having thus fully described my improvements, what I claim as my invention, and desire to secure by Letters Patent, is—

The process of manufacturing commercial plaster which consists in calcining pulverized sulphate of lime in the presence of tankage obtained from rendering fats, said tankage being thoroughly mixed therewith in dry pulverized state, and continuing the heat to a temperature of about 380° to 420° Fahrenheit or until the organic constituency of the tankage is charred, as set forth.

WILLIAM M. REESE.

Witnesses:
A. A. SHELTON,
T. B. MOSLEY.